(12) United States Patent
Moretto

(10) Patent No.: US 8,388,841 B2
(45) Date of Patent: Mar. 5, 2013

(54) FILTER CARTRIDGE, PARTICULARLY FOR PERCOLATING FILTER JUGS, AND METHOD OF MANUFACTURING IT

(75) Inventor: Maurizio Moretto, Vicenza (IT)

(73) Assignee: Laica S.p.A., Barbarano Vicentino (VI) (IT)

( * ) Notice: Subject to any disclaimer, the term of this patent is extended or adjusted under 35 U.S.C. 154(b) by 350 days.

(21) Appl. No.: 12/666,803

(22) PCT Filed: May 19, 2008

(86) PCT No.: PCT/EP2008/003992
§ 371 (c)(1),
(2), (4) Date: Dec. 26, 2009

(87) PCT Pub. No.: WO2009/000374
PCT Pub. Date: Dec. 31, 2008

(65) Prior Publication Data
US 2011/0315622 A1    Dec. 29, 2011

(30) Foreign Application Priority Data

Jun. 26, 2007  (IT) .............................. PD2007A0216

(51) Int. Cl.
*B01D 24/12*    (2006.01)
(52) U.S. Cl. ........ 210/282; 210/289; 210/293; 210/495; 210/498
(58) Field of Classification Search .................. 210/282, 210/289, 291, 293, 464, 482, 495, 498, 418; 99/295, 299
See application file for complete search history.

(56) References Cited

U.S. PATENT DOCUMENTS

| | | | |
|---|---|---|---|
| 1,905,350 A * | 4/1933 | Page | ............................... 99/298 |
| 3,529,726 A | 9/1970 | Keenan | |
| 4,301,009 A | 11/1981 | Cook et al. | |
| 4,541,926 A | 9/1985 | Stanley | |
| 5,238,576 A * | 8/1993 | Affonso | ........................ 210/684 |
| 5,322,625 A | 6/1994 | Rise | |
| 8,101,076 B2 * | 1/2012 | Moretto | ....................... 210/232 |

FOREIGN PATENT DOCUMENTS
WO    WO 2006126237 A2 * 11/2006

OTHER PUBLICATIONS

International Search Report and Written Opinion in related PCT application PCT/EP2008/003992, Dec. 2008.

* cited by examiner

*Primary Examiner* — Matthew Savage
(74) *Attorney, Agent, or Firm* — Kristina Castellano; Castellano PLLC

(57) ABSTRACT

A filter cartridge (1), particularly for percolating filter jugs, with a cartridge body (2) intended to contain a filter bed, provided with at least one inlet aperture (7) for the fluid to be filtered and at least one opposing outlet aperture (8) for the filtered fluid, with at least one grid (11) for retaining the filter bed inside the body and an element (12) for limiting the outflow of the filtered fluid at the outlet aperture (8), in which the grid (11) and the limiting element (12) are both placed in the same seat (10) provided in the outlet aperture (8) of the cartridge body (2).

6 Claims, 2 Drawing Sheets

FILTER CARTRIDGE, PARTICULARLY FOR PERCOLATING FILTER JUGS, AND METHOD OF MANUFACTURING IT

CLAIM FOR PRIORITY

This application is a U.S. National Stage Application of PCT/EP2008/003992 filed on May 19, 2008, claiming priority to Italian Patent Application number PD2007A000216 filed Jun. 26, 2007, the contents of both of which are incorporated herein by reference.

TECHNICAL FIELD

The present invention relates to a filter cartridge, particularly for percolating filter jugs, and to a method of manufacturing it.

TECHNOLOGICAL BACKGROUND

In the technical field of filter cartridges, there is a known method of making the cartridge body in the form of a container having at least one grid for retaining the filter bed in the body and an element for limiting the outflow of the filtered fluid at the outlet aperture. An example of this cartridge structure is described in WO2004/014801 in the name of Strix Ltd.

The cartridge body is normally formed from two parts, namely a cup and a lid, assembled after the filter bed and the grid which keeps it away from the outlet aperture have been introduced into the cup.

However, this method of constructing cartridges has a number of drawbacks. In the first place, it is necessary to provide relatively large moulds, particularly for the cartridge body, which incorporate all the components of the body. It should also be noted that the moulding of relatively large components gives rise to problems concerning the flow of material into the mould cavity, the repeatability of the shapes, and the control of thickness which may create significant problems of construction and quality. Secondly, it is necessary to prepare different moulds for each cartridge body, even if the bodies only differ slightly from each other.

DESCRIPTION OF THE INVENTION

The principal object of the present invention is to develop a filter cartridge and a method of manufacturing it which are structurally and functionally designed so as to overcome all the drawbacks of the aforementioned prior art.

This problem is tackled and resolved by the invention by means of a filter cartridge and a method of manufacturing it in accordance with the following claims.

BRIEF DESCRIPTION OF THE DRAWINGS

The features and advantages of the invention will become clear from the following detailed description of some preferred but non-exclusive examples of embodiment thereof, illustrated, for the purposes of guidance and without restrictive intent, with reference to the attached drawings, in which:

FIG. 6 is a schematic overall view of a different type of cartridge which can also be made according to the technical teachings of FIGS. 2 to 5.

PREFERRED EMBODIMENTS OF THE INVENTION

Figure 1:
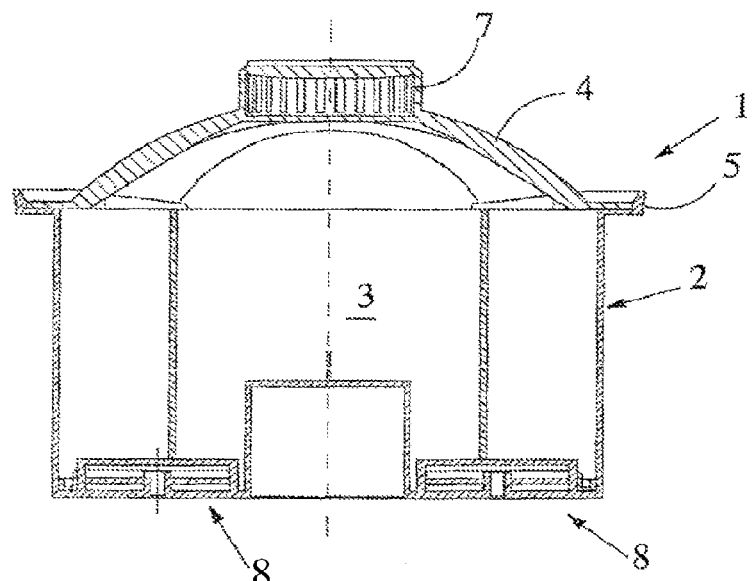
FIG. 1 is a schematic sectional view of a filter cartridge made according to the invention.
Figure 2:
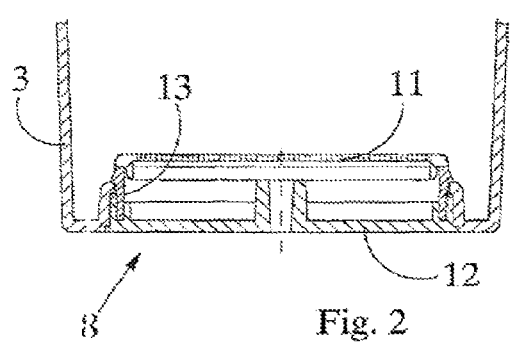
FIG. 2 is a sectional view on an enlarged scale of a component of the cartridge of FIG. 1.
Figure 4:
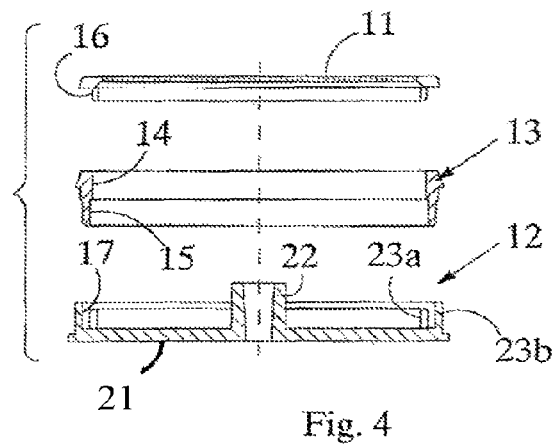
FIG. 4 is an exploded view of the component of FIG. 2.

In FIG. 1, the number 1 indicates the whole of a filter cartridge for percolating filter jugs and similar devices designed for filtering water for drinking and food use.

The cartridge 1 comprises a cartridge body 2 with a cup-shaped lower part 3 and a lid-shaped upper part 4, joined together in a watertight way at a perimetric lip 5 by means of which the cartridge is fitted in a watertight way into a seat provided for it in the jug.

The cartridge body 2 is intended to contain a filter bed (not shown), such as a mixture of ion exchange resins and/or activated charcoal, of a known formulation, through which the flow of water to be filtered passes when it is in use. In the body 2 there is provided at least one inlet aperture 7 for the fluid to be filtered and at least one opposing outlet aperture 8 (two apertures in the illustrated example) for the filtered fluid, located at the base of the cartridge.

All the outlet apertures, except in the different variant embodiments of the apertures described below, are identical to each other, and the corresponding components are therefore identified by the same reference numerals.

According to the invention, a circular aperture is made in the base of the cartridge body 2 at the position of each outlet aperture, forming a seat 10 for housing a grid 11 for retaining the filter bed within the said body and an element 12 for limiting the outflow of the filtered fluid. The grid 11 and the limiting element 12 are both placed in the seat 10 in the form of a plug for this seat.

With reference to the example of embodiment of the invention shown in FIGS. 1 to 4, the grid 11 and the limiting element 12 are assembled into a package with the interposition of a mounting ring 13, thus forming a unit which can be handled individually and is inserted into the seat 10. In this case, the mounting ring has axially opposing ends having respective seats 14, 15 into which respective counter-seats 16, 17 of the grid and the limiting element 11, 12 are fitted with a shape coupling or by welding. The ring 13 also has an annular projection 18 in an intermediate outer shell portion, with which it is coupled by bearing against, or by snap-fitting on to, an annular tooth 19 projecting from the inner shell of the seat 10.

The limiting element takes the form of a plug with a flat base 21, with a perforated central appendage 22 projecting towards the grid 11 and with a counter-seat 17 formed between two concentric collars 23*a, b* between which the end portion of the ring 13 is received.

Figure 5:
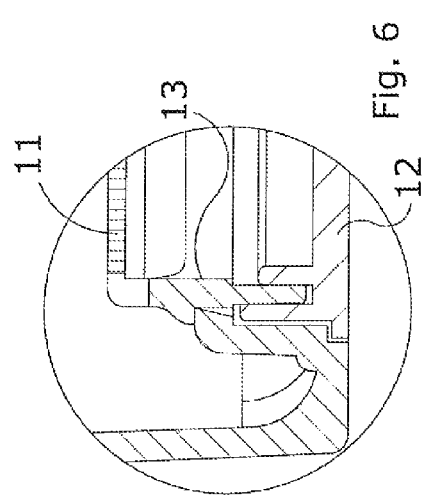

The example of FIG. 5 is substantially similar to the preceding example, with the sole difference that the mounting ring 13 is made in one piece with the shell of the seat 10.

Figure 3:
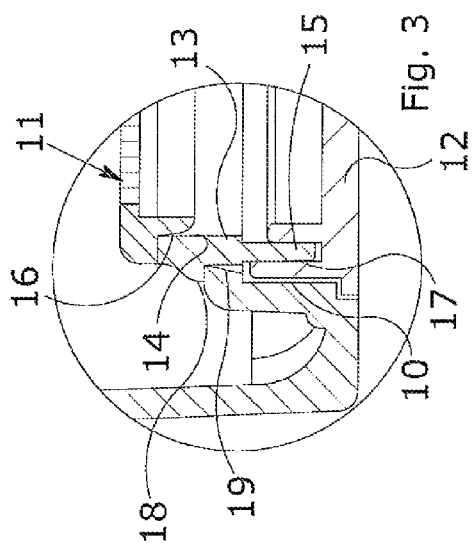
FIG. 3 is a sectional view on an additionally enlarged scale of the component indicated by the arrow A in FIG. 1.
Figure 6:
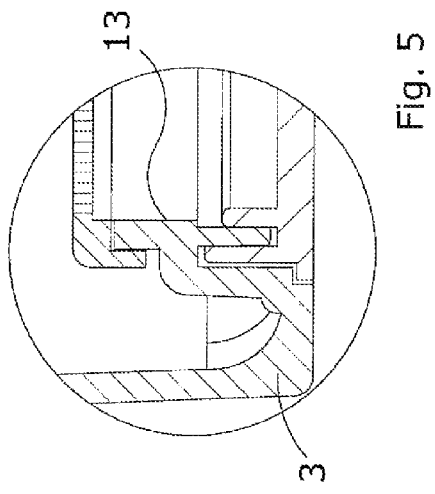
FIGS. 5 to 7 are views corresponding to that of FIG. 3, relating to three variant embodiments of the cartridge of the preceding figures.

The example of FIG. 6 is similar to the example of FIG. 3, with the difference being the configuration of the connection of the grid to the mounting ring 13.

Figure 7:
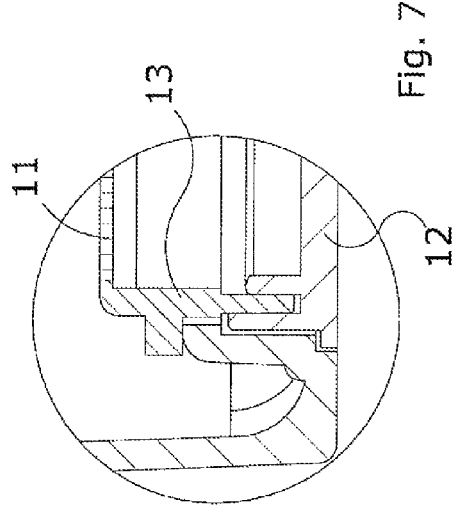

The example of FIG. 7 is also similar to the preceding example of FIG. 3 with the difference being that the mounting ring 13 is made in one piece with the grid 11.

The method of manufacturing the cartridge 1 comprises the steps of preparing the cartridge body 2 and of preparing separately at least the filter bed retaining grid 11 and the corresponding flow limiting element 12, and of placing it in the outlet aperture, assembling the parts together.

Preferably, the grid 11 and the limiting element 12 are pre-assembled together before their assembly in the outlet aperture.

The invention thus resolves the stated problem while also yielding numerous benefits, including a reduced moulding cost, improved geometrical and dimensional precision of its components, adaptability of these components to different cartridges, and an improved cartridge assembly cycle.

The invention claimed is:

1. A filter cartridge, for percolating filter jugs, comprising a cartridge body containing a filter bed, provided with at least one inlet aperture for fluid to be filtered and at least one opposing outlet aperture for filtered fluid, with at least one grid for supporting the filter bed comprising granular filter media inside said body and a flow limiting element for limiting outflow of the filtered fluid at the outlet aperture, wherein said flow limiting element comprises a solid flat base and a perforated central appendage, said perforated central appendage projecting toward the grid and defining an outlet flow passage of the filter cartridge which is the only outlet of the filtered fluid, wherein said flat base and said perforated central appendage are separated from said grid, wherein the outlet aperture defines a seat, wherein a mounting ring is fixed in said seat, and wherein said grid is fixed to one end of the mounting ring and the flow limiting element is fixed to the other end of the mounting ring.

2. The filter cartridge of claim 1, wherein the mounting ring is fixed to the seat by a snap-fit connection.

3. The filter cartridge of claim 1, wherein the mounting ring made in one piece with the seat.

4. The filter cartridge of claim 1, wherein the grid is fixed to the mounting ring by one of a shape coupling and welding.

5. The filter cartridge of claim 1, wherein the mounting ring is made in one piece with the grid.

6. The filter cartridge of claim 1, wherein the flow limiting element is fixed to the mounting ring by one of a shape coupling and welding.

* * * * *